Patented June 1, 1937

2,082,110

UNITED STATES PATENT OFFICE 2,082,110

REGULATING SYSTEM

Harvey T. Langabeer, South Ozone Park, N. Y., assignor to Bell Telephone Laboratories, Incorporated, New York, N. Y., a corporation of New York Application October 20, 1934, Serial No. 749,153

8 Claims. (Cl. 171—314)

This invention relates to automatic regulating systems for electric generators used in connection with a floating storage battery, and more particularly to systems for controlling the connections of a plurality of generators to the load circuit of the system, one at a time, in accordance with the requirements of the load.

The principal object of the invention is to secure reliable automatic control of systems of the above mentioned character.

Another object is to automatically start and stop motor-generator sets as required in accordance with the load requirements and the voltage of the battery.

Another object is to prevent simultaneous starting of two or more generator sets upon the return of the power supply following a power failure.

Another object is to disconnect any one of the motor-generator sets from service at will and to transfer the automatic control of that set to the next set.

A still further object is to automatically regulate the voltage of each generator, supplying the load, within predetermined high and low limits and to prevent overloading of the generators under low battery voltage conditions.

Another object is to insure that all generators connected to the load, except the last operating generator of the group, shall at all times deliver their individual predetermined full load current output.

Another object is to stop a newly started generator if the battery voltage rises above a certain value before the generator is connected to the load and remains above this value for a predetermined time interval.

Another object is to regulate the battery voltage between predetermined high and low voltage limits during the period the battery is floating across the load and between other predetermined high and low voltage limits during the period the battery is receiving a charge.

Another object is to stop any generator, in the event of the opening of an associated individual fuse, and automatically start the next idle generator and connect it to the load in substitution for the disabled generator.

Another object is to stop all machinery when the fuse in the common lead between the generator and battery is opened.

Features of this invention whereby the foregoing objects are attained are as follows:

One feature of the invention resides in an arrangement whereby the starting of the next idle generator of the group to relieve an overload condition on the generators in operation is jointly controlled by an ammeter relay in the output of the last operating generator and a voltmeter relay connected across the battery, whereby even though the last operating machine of the group supplying the load has reached its full load capacity and its current relay has closed its high contact this will not be effective to start the next machine if the battery voltage is above a predetermined value. In other words the last operating machine must be running at full load and the battery voltage must be below a predetermined value before the next machine is started and connected to the load.

Another feature of the invention resides in the use of alarm fuses in the various circuits of each generator, any one of which when blown will close a circuit to start the next idle machine in the group and stop the generator associated with the operated fuse.

Another feature resides in the use of an alarm fuse in the common or main lead between the generators and the battery whereby when this fuse opens all generators in operation will stop.

A still further feature resides in an arrangement whereby if a generator which had been supplying the load is manually disconnected from the battery and load for maintenance or other reasons and a succeeding machine is substituted therefor, the stopped machine will not be restarted, when it is switched back ready for service, and the substitute machine stopped, if the load is stationary or decreasing.

A related feature resides in means whereby if the load is increasing when the stopped generator is switched back ready for service, it will start and gradually take up the load previously carried by its substitute generator to a point where the current output of the substitute generator has been reduced below zero at which time the substitute generator will stop.

Another feature of the invention resides in the provision of an arrangement whereby upon the resumption of the power supply following a failure thereof the normal periodic control of the individual generator field rheostats is disabled and they are successively moved by a continuous operation to rapidly bring their associated generators up to full output. When the battery voltage rises to a proper value the normal rheostat control is again made effective.

Additional features of the invention will appear from consideration of the following description:

Figure 1:
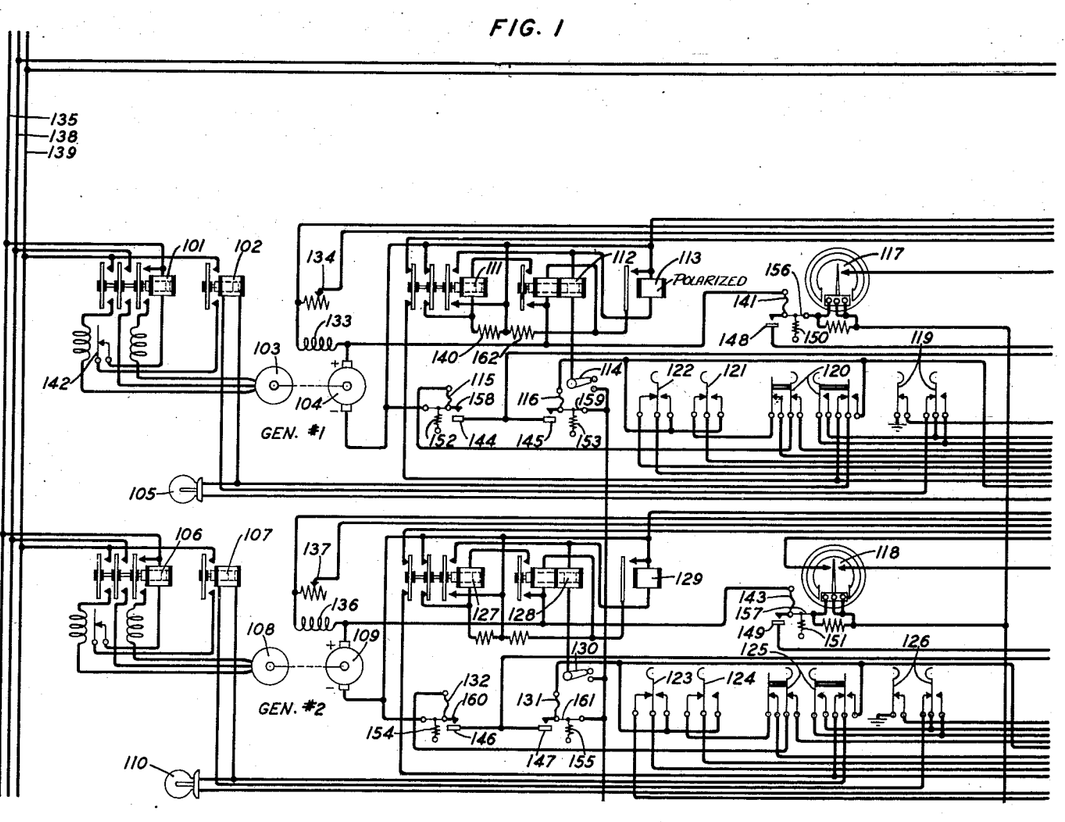
Figure 2:
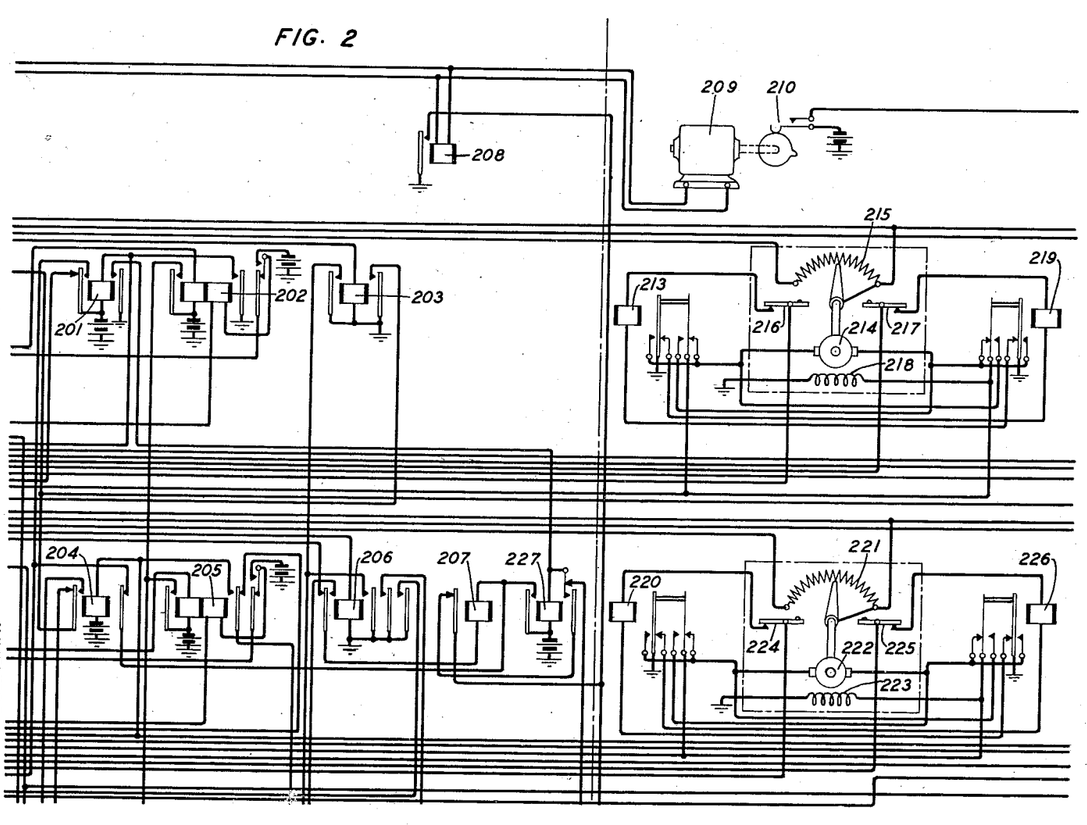
Figure 3:
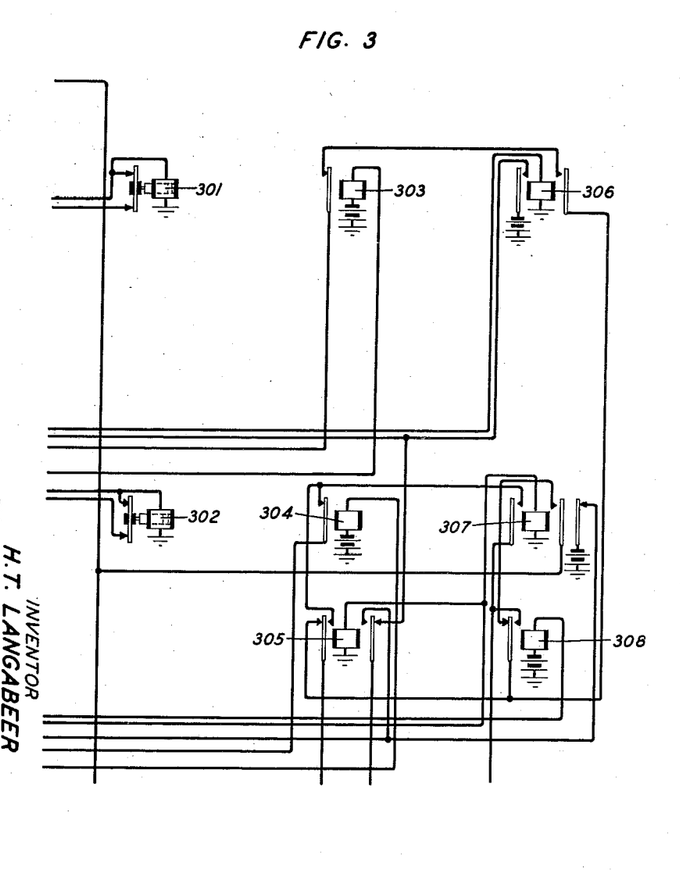
Figure 4:
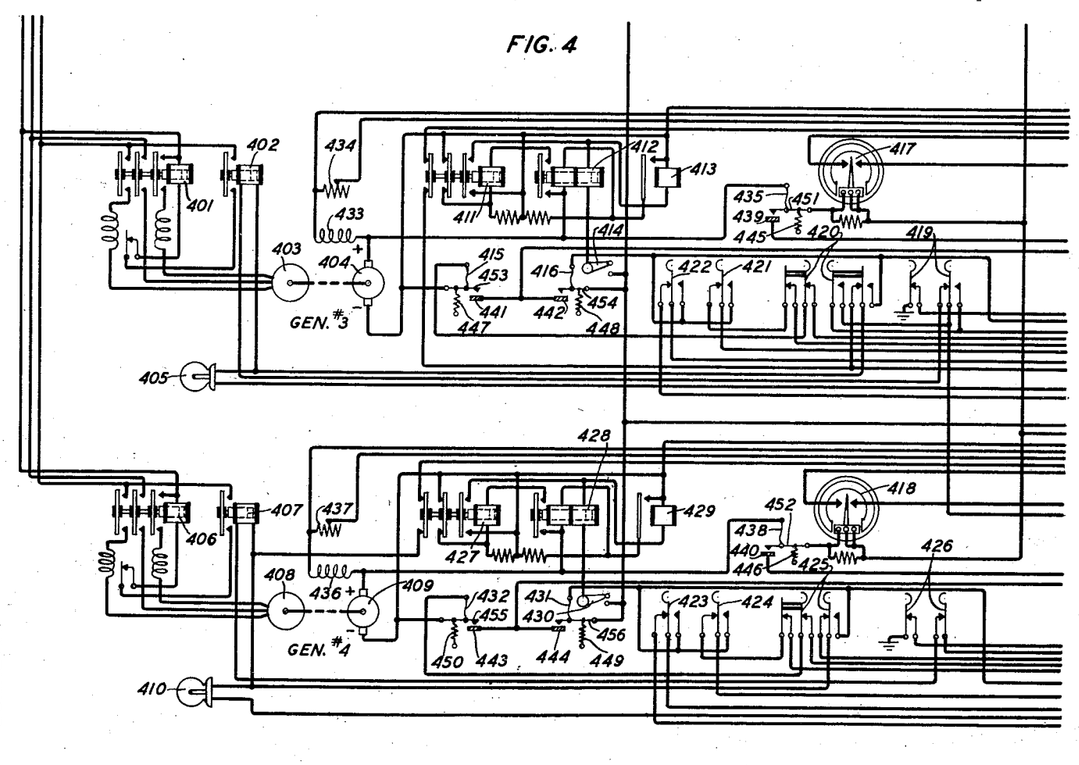
Figure 5:
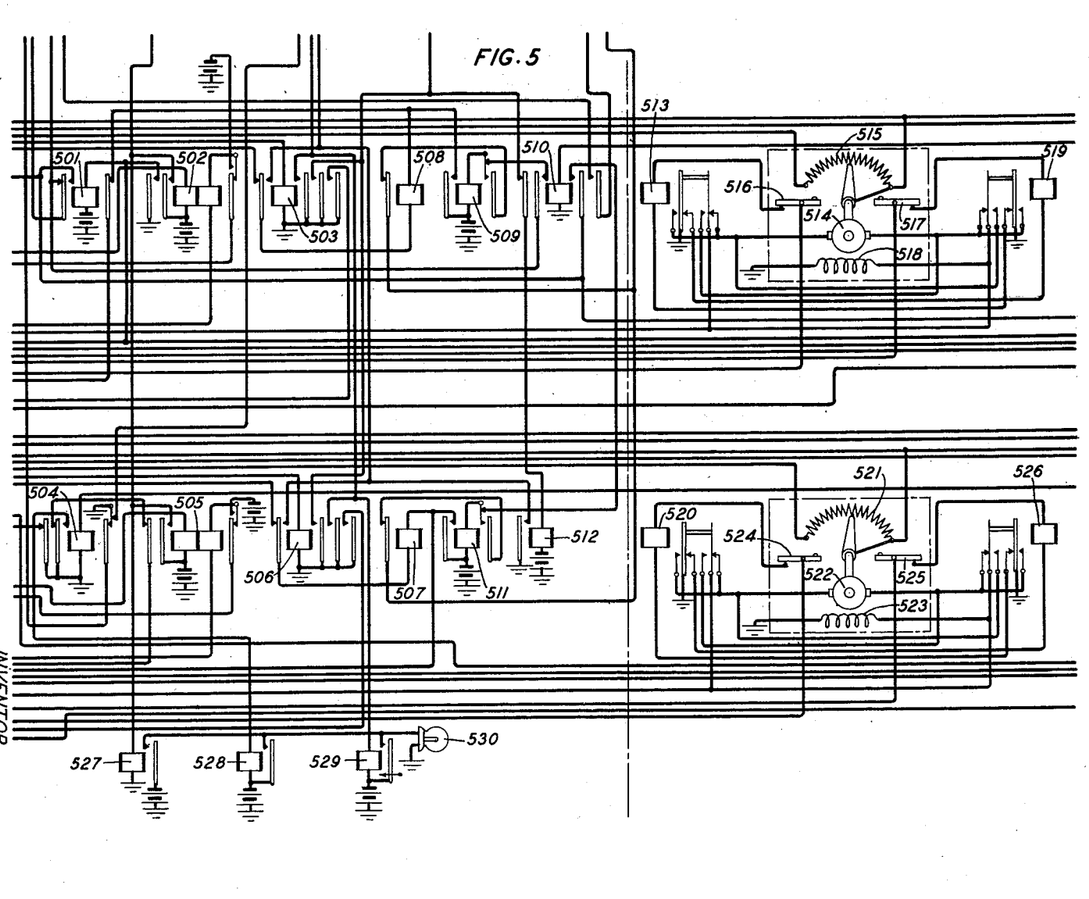
Figure 6:
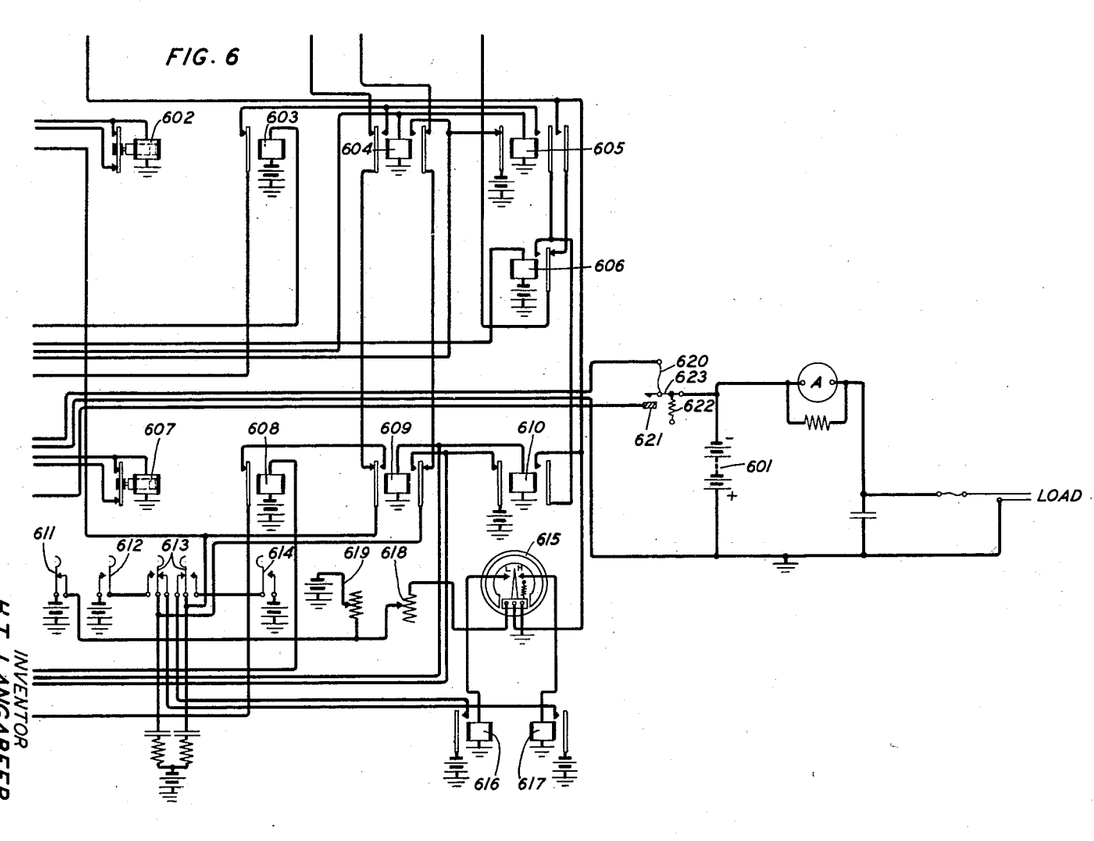
Figure 7:
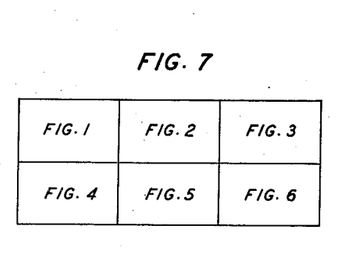

This invention will be more readily understood by reference to the drawings, which show one embodiment of the invention, in which Fig. 7 shows the arrangement of Figs. 1, 2, 3, 4, 5, and 6 to form a complete operative system. Four motor-generator sets are shown together with suitable control apparatus so arranged that the current delivered by the motor-generator sets is controlled by the voltage of the battery, the current being increased when the battery voltage becomes lower than a specified value and decreased when the battery voltage rises above that value. If the voltage of the battery becomes such that the regulated motor-generator set delivers its full load current, another motor-generator set is started and connected to the load and the fluctuations in the load are taken up by this machine up to its full load capacity. In a similar manner if the battery voltage rises sufficiently to cause the last connected motor-generator to reduce its output until it takes current from the battery, the motor-generator disconnects itself from the load and the control is shifted to the previous machine. In order that the control mechanism may not be subject to constant wear due to battery voltage fluctuations of short duration, arrangements are provided so that the battery voltage is tested and the current adjusted at intervals of say ten seconds.

The invention will now be described in detail with reference to the drawings. It will be assumed that no generators are running, that switches 114, 130, 414, and 430 are closed and that the battery voltage is below the specified minimum in which case generator 1 shown as 104 on the drawings is started and connected to the battery. This is accomplished by the operation of relay 102. The operating circuit for relay 102 is traced from ground through the right-hand contact and armature of relay 504, right-hand normally made contacts of out-of-service key 119, the winding of relay 102 to battery through the right-hand back contact of test key 120 and the left-hand back contact of relay 201. Relay 102, operated, connects the power supply to motor starter 101. The path for the operation of motor starter 101 is traced from power supply conductor 135, through the winding of motor starter 101 through circuit breaker contacts 142, through the contacts of relay 102 to power supply conductor 139. Motor starter 101 connects power supply conductors 135, 138 and 139 to motor 103 which is mechanically coupled to generator 104. Relay 203 also operates in a path traced from battery through the left-hand back contact of relay 201, outer normally made contacts of contactor 111 to ground through the winding of relay 203. Relay 203, operated, connects ground through its right-hand front contact, through the filament of generator failure lamp 105, through the right-hand back contacts of test key 120 to battery through the left-hand back contact of relay 201. Generator failure lamp 105 lights in this circuit and remains lighted until contactor 111 operates and releases relay 203. Relay 203 also connects ground through its left-hand front contacts to alarm relay 529. The latter relay is of the slow operating type and operates and lights alarm lamp 530 only in case generator 104, or one of the other generators fails to be connected to the load within a predetermined time which is less than the operating time of relay 529.

During the stopped and starting period of generator 104, the field rheostats 134 and 215 are short-circuited so that the voltage will build up rapidly. When this voltage reaches a sufficiently high value relay 301 operates. The field circuit of generator 104 previous to the operation of relay 301 is traced from the negative generator terminal, back contacts of relay 301 to the positive generator terminal through the field winding 133. After the operation of relay 301, the field circuit includes manually controlled rheostat 134 and motor-driven rheostat 215. Under this condition the field circuit is traced from the negative terminal of generator 104, motor rheostat 215, manual rheostat 134 to the positive terminal of generator 104 through field winding 133. The operating path for relay 301 is traced from ground through the winding of relay 301, the negative terminal of generator 104, the positive terminal of generator 104 to the grounded terminal of battery 601 through fuse 141 and ammeter relay 117. The voltage from generator 104 also operates relay 306 in a path traced from ground through the winding of relay 306, through the left-hand inner contacts of test key 120, fuse 115, the negative terminal of generator 104, the positive terminal of generator 104 to ground through fuse 141 and ammeter relay 117.

Since it has been assumed that the battery voltage is below the specified minimum, the low voltage contacts of voltmeter relay 615 will be closed and relay 616 operated each time motor interrupter 210 closes its contacts. The voltmeter relay circuit is traced from ground through the winding of voltmeter relay 615, variable resistance 618 to battery through the contacts of key 611. The circuit for the operation of relay 616 is traced from ground through the winding of relay 616, low voltage contacts of voltmeter relay 615, to battery through the contacts of motor interrupter 210. Interrupter 210 is driven by motor 209 at a speed to cause it to close its contacts at definite intervals, say for one-half second every ten seconds. Each time relay 616 operates it connects battery through its contacts, through the right-hand back contact of key 613, the left-hand back contacts of relays 609, 604, and 305, the right-hand front contact of relay 306, back contact of relay 303, the back contact of key 122, through the limit contacts of limit switch 216 of motor-driven rheostat 215, through the winding of relay 213 to ground through the inner back contacts of relay 219. Relay 213 operates in this circuit and connects battery to motor 214 causing it to rotate in a direction to reduce the resistance of rheostat 215, which is in the field circuit and to raise the voltage of generator 104. The circuit for the operation of motor 214 is traced from ground through the inner front contacts of relay 213, armature of motor 214, outer back contacts of relay 219, to battery through fuse 116. The field winding 218 associated with armature 214 is excited continuously in a circuit traced from ground through field winding 218 to battery through fuse 116.

As explained previously motor 214 will cut out resistance in the field circuit of generator 104 and raise its voltage whenever interrupter 210 makes it contacts, while voltmeter relay 615 is on its low voltage contacts.

When the generator voltage rises to a value, higher than the battery voltage, polarized relay 113 operates and causes generator 104 to be connected to the battery. The circuit for the operation of relay 113 is traced from the negative terminal of battery 601, through main charging fuse 620, switch 114, the right-hand winding of relay 112, the winding of relay 113, the negative terminal of generator 104, the positive terminal of generator 104 to ground through fuse 141 and ammeter relay 117. Relay 113 being polarized does not operate when the generator voltage is lower than the battery voltage.

The operation of relay 113 causes the operation of relay 112 in a circuit traced from the negative terminal of generator 104, contacts of relay 113, the left-hand winding of relay 112 to the positive terminal of generator 104. The operation of relay 112 causes the operation of contactor 111 in a circuit traced from the positive terminal of generator 104, the contacts of relay 112, the winding of contactor 111, the middle back contacts of contactor 111 to the negative terminal of generator 104. After the operation of contactor 111 the winding of relay 113 is short-circuited, relay 113 is released and the circuit for holding contactor 111 operated is traced from the negative terminal of generator 104, resistance 140, the winding of contactor 111, the contacts of relay 112 to the positive terminal of generator 104. The operation of contactor 111 connects generator 104 to battery 601. This circuit is traced from the positive terminal of generator 104, fuse 141, ammeter relay 117 to the grounded side of battery 601 and from the negative terminal of generator 104, inner front contacts of contactor 111, right-hand winding of relay 112, switch 114 to the ungrounded terminal of battery 601 through fuse 620. Since the generator voltage is higher than the battery voltage current flows from the generator to the battery and thence to the load and this current is in a direction to hold relay 112 operated. The release of relay 113 also alters the circuit for the left-hand winding of relay 112 to include resistance 162. Under this condition relay 112 is held operated for the most part by the current through its right-hand winding in order to insure the release of this relay should the generator draw current from the battery. The circuit for the left-hand winding of relay 112 when contactor 111 operates is traced from the positive terminal of generator 104, left-hand winding of relay 112, resistance 162 to the negative terminal of generator 104. The operation of contactor 111 also opens the operating circuit of relay 203 which releases, extinguishing generator failure lamp 105, and opening the circuit to relay 529.

*Increasing load*

As the load on the battery increases the battery voltage will be decreased and voltmeter relay 615 will close its low voltage contacts and operate relay 616 whenever interrupter 210 closes its contacts, as described previously. Relay 616, operated, causes the operation of relay 213 which closes the circuit to armature 214 and reduces the resistance in the field circuit of generator 104. Reducing the field resistance causes generator 104 to increase its output voltage and more current flows to the battery to compensate for the greater load.

*Decreasing load*

When the voltage of battery 601 rises due to a decrease in the load, voltmeter relay 615 closes its high voltage contacts and relay 617 is operated as often as interrupter 210 closes its contacts. The circuit for the operation of relay 617 is traced from battery through the contacts of interrupter 210, armature and high voltage contacts of voltmeter relay 615 to ground through the winding of relay 617. The operation of relay 617 causes the operation of relay 219 in a circuit traced from battery through the contacts of relay 617, left-hand back contacts of key 613, right-hand back contacts of relays 609, 604, and 305, the left-hand outer back contact of test key 120, the back contact of key 121, the contacts of limit switch 217 to ground through the winding of relay 219 and the inner back contacts of relay 213. Relay 219, operated, completes a circuit to the armature 214 of motor-driven rheostat 215 and causes it to increase the resistance in the field circuit of generator 104. The circuit involving armature 214 is traced from ground through the inner front contact of relay 219, armature 214 to battery through the outer back contact of relay 213 and fuse 116. Relay 617 continues to operate under control of interrupter 210 and cause motor rheostat 215 to increase the field resistance and lower the generator voltage as long as voltmeter relay 615 remains on its high voltage contacts or until the motor has cut all the resistance of rheostat 215 into the field circuit of generator 104 and has operated limit contacts 217, thus opening the circuit to relay 219 and stopping motor 214.

*Starting and connection of additional generator*

If the load on the battery increases and the battery voltage is correspondingly lowered and motor-driven rheostat 215 increases the output of generator 104 up to a predetermined value, which may be the full load of the generator, ammeter relay 117 closes its contacts. The closure of the contacts of ammeter relay 117 starts the second generator, shown on the drawings as generator 109, raises its voltage to a value above the battery voltage and connects it to the battery in the following manner: The closure of the contacts of ammeter relay 117 operates relay 303 by connecting ground to its upper winding terminal, its lower terminal being connected to battery. The operation of relay 303 opens the circuit from relay 616 to relay 213, previously described and prevents motor rheostat 215 from further increasing the load of generator 104. If voltmeter relay 615 remains on its low voltage contacts, relay 616 will be operated and relay 510 is energized in a circuit traced from battery through the contacts of relay 616, right-hand back contacts of key 613 to ground through the winding of relay 510. Relay 510, operated, completes a circuit from ground on the contacts of ammeter relay 117 left-hand back contact of relay 204, right-hand outer front contact of relay 510 to battery through the right-hand back contact and winding of relay 227, operating the later relay. Relay 227 locks in a circuit traced from ground through the front contacts of power failure relay 208, which is held operated by the power supply and releases only under the condition of power failure, through the back contact of relay 207 and the right-hand front contact and winding of relay 227 to battery. The operation of relay 227 causes the operation of relay 107 in a circuit traced from battery through the left-hand front contacts of relay 227, right-hand back contact of relay 204, right-hand outer back contact of test key 125, winding of relay 107, right-hand back contact of key 126, right-hand inner back contact of relay 205 to ground through the right-hand back contact of relay 504. Relay 206 also operates in a circuit traced from battery through the left-hand front contacts of relay 227, right-hand back contact of relay 204, outer back contacts of contactor 127 to ground through the winding of relay 206. Relay 206, operated, grounds the lead to the alarm relay 529 and lights the generator failure lamp 110 in a manner similar to that described for the starting of generator 104. The operation of relay 107 causes the operation of motor starter 106 which in turn causes motor 108 to rotate and generator 109 to build up a voltage as in the case of generator 104. The field rheostats of generator 109 are short-circuited by relay 302 in a similar manner to that described for the starting of generator 104 and when generator 109 builds up a sufficient voltage relay 302 operates, removing the short-circuit from the field rheostats 137 and 221. Relays 307 and 305 also operate on the generator voltage in a circuit traced from ground through the windings of relays 307 and 305 in parallel, left-hand inner back contact of test key 125, fuse 132, negative terminal of generator 109, positive terminal of generator 109 to ground through fuse 143 and ammeter relay 118. The operation of relays 307 and 305 shifts the control circuit from generator 1 to generator 2. If the voltage relay remains on its low voltage contacts the voltage of generator 109 is raised by the operation of motor rheostat 221 in a similar manner to that described for generator 1. When the voltage of generator 109 rises to a higher value than that of the battery, relay 129 operates and operates relay 128 and contactor 127. The operation of contactor 127 opens the circuit of relay 206 and connects generator 109 to the load in a manner similar to that previously described. Generator 104 is maintained at full load and the fluctuations of load are taken up by generator 109 through motor-driven rheostat 221.

In a similar manner, generator set 3 is started and connected to the battery if ammeter relay 118 closes its contacts due to generator 109 having reached a predetermined current output and generator 109 is maintained at this current and the control is shifted to generator 404. Should generator 404 reach its full load output, generator set 4 is started and connected to the battery in the same way and the control from voltmeter relay 615 is shifted to motor-driven rheostat 521.

*Disconnection of generator from battery*

If more than one generating set is in operation and due to a reduction in the load on the battery, the battery voltage rises to such a degree that the automatic control of the last connected generator reduces the output of that generator until it starts to take current from the battery, this last connected generator is stopped and the automatic control is shifted to the generator next previously connected.

For example, let it be assumed that generator set 1 is being maintained at full load and that generator set 2 is also in operation, its current output being controlled by voltmeter relay 615 through motor rheostat 221. If, due to the high voltage condition of the battery, motor rheostat 221 reduces the current output of generator 109 to such a degree that ammeter relay 118 closes its low contacts, current relay 207 is operated in a path traced from ground on the low current contacts of ammeter relay 118, left-hand back contacts of relay 206, winding of relay 207 to battery through the left-hand front contacts of relay 227. The operation of relay 207 opens the locking path of relay 227, releasing it. Relay 227. released, releases relay 207 and relay 107 which in turn releases motor starter 106, disconnecting the power supply from motor 108. Under this condition, generator 109 operates as a motor taking current from the battery. The current in the right-hand winding of relay 128 is thus reversed and relay 128 released, releasing contactor 127. Relays 305 and 307 release since generator 109 is no longer generating a voltage. The release of relay 305 shifts the voltmeter relay control to motor rheostat 215 and relay 307, released, contacts battery through its right-hand outer back contact, the left-hand outer back contact of key 125, back contact of key 124, the contacts of limit switch 225, to ground through the winding of relay 226 and the inner back contacts of relay 220. Relay 226, operated, operates motor 222 to cut in resistance in the field circuit of generator 109. Motor 222 continues to cut in resistance until limit switch 225 is reached which, when operated, opens the circuit to relay 226 which releases, stopping motor 222 and leaving motor rheostat in the all resistance cut in position.

*Removing a generating set from service*

If it is desired to remove a generating set from service for maintenance purposes or for other reasons, the out of service key 119, 126, 419 or 426 associated with the generating set which it is desired to remove, is operated. If, for example, it is desired to remove generating set 2, key 126 is operated. The operation of this key opens the operating circuit of relay 107 releasing it, if generator 109 is operating at that time, and in turn releasing motor starter 106. Relay 128 and contactor 127 release on reverse current as previously described. The operation of key 126 also causes the operation of relays 204 and 308 in a circuit traced from ground through the right-hand back contacts of relay 504, right-hand inner back contact of relay 205, right-hand front contact of key 126 to battery through the windings of relays 204 and 308 in parallel. Relay 204, operated, transfers the conductor attached to the high current contacts of ammeter relay 117 from relay 227, to relay 509 so that generator set 3 will be started when ammeter relay 117 closes its contacts and the voltmeter relay 615 is on its low voltage contacts.

*Restoring a generating set to service*

For the purpose of describing the restoring of a generator to service it will be assumed that the load is such as to require the operation of two generators and that key 126 has been previously operated, removing generator set 2 from service. Under this condition, generator 104 will be supplying its full load with the contacts of ammeter relay 117 closed and generator 404 will be in operation with a variable load under control of voltmeter relay 615.

Restoring key 126 to its normal position opens the operating path and releases relays 204 and 308. Relay 204, released, closes a circuit from ground through the contacts of ammeter relay 117, left-hand back contact of relay 204, right-hand outer front contact of relay 510, which is operated when voltmeter relay 615 closes its low voltage contacts, to battery through the right-hand back contacts and winding of relay 227. Relay 227 locks and causes motor 108 to be connected to the power supply and generator 109 to build up its voltage as previously described. Relays 305 and 307 operate on the generator voltage as before and whenever interrupter 210 closes its contacts, a circuit is completed from battery through the contacts of interrupter 210, right-hand outer front contact of relay 605, back contact of relay 606, left-hand front contact of relay 307, back contact of relay 304, back contact of key 123, the contacts of limit switch 224 to ground through the winding of relay 220 and inner back contact of relay 226.

Relay 220 operates in the circuit traced above and causes motor-driven rheostat 221 to cut out resistance in the field circuit of generator 109. The voltage of generator 109 is thereby raised and when it reaches a value higher than that of the battery relay 129 operates, operating relay 128 and contactor 127 and connecting generator 109 to the battery. Relay 220 continues to be operated whenever interrupter 210 closes its contacts and as the voltage of generator 109 is raised, the battery voltage will be raised and motor rheostat 515 will gradually reduce the output of generator 404 as that of generator 109 is increased until ammeter relay 417 closes its low current contacts and disconnects generator 404 from the battery as previously described. When generator 404 is disconnected the control from voltmeter relay 615 is shifted to motor rheostat 221 through the release of relays 604 and 605.

*Operation of generator set which is disconnected from service*

Let it be assumed that it is desired to operate generating set 2 which has been removed from service by the operation of the out-of-service key 126, for testing or for other reasons. Key 125 is provided for this purpose which, when operated, opens the operating circuit of relays 305 and 307 to prevent shifting the automatic voltage control to this generating set when the generator builds up a voltage and opens the circuit from the right-hand back contact of relay 307 to relay 226 so that motor rheostat 215 will not automatically cut in all of its resistance when relay 307 is released. Relays 204 and 308 are also operated so that the contacts of ammeter relay 117 will cause generator set 3 to be started should generator set 1 become fully loaded. The operating path for relays 204 and 308 is traced from ground through the right-hand back contacts of relay 504, right-hand inner back contact of relay 205, right-hand inner front contacts of key 125 to battery through the windings of relays 204 and 308 in parallel. Switch 130 is opened to disconnect the generating set from the battery.

Generator set 2 may now be started and stopped by means of key 126 in the manner described previously and any tests made which may be desirable. The voltage of generator 109 may be raised by operating key 123 or lowered by the operation of key 124. The circuit involving key 123 is traced from battery through fuse 131, front contact of key 123, limit switch contacts 224 to ground through the winding of relay 220 and the inner back contact of relay 226. The circuit involving key 124 is traced from battery through fuse 131, front contact of key 124, limit switch contacts 225 to ground through the winding of relay 226 and the inner back contact of relay 220. Relay 220 operated, causes motor rheostat 221 to cut resistance out of the field circuit of generator 109 and the operation of relay 226 causes rheostat 221 to cut resistance into the field circuit.

When it is desired to restore generator set 2 to service key 126 is operated to the out-of-service position, test key 125 is restored to normal and switch 130 closed. Key 126 is then restored to normal, restoring generator set 2 to normal automatic operation as described under "Restoring a generator set to service".

*Power failure*

In the event of a failure of the power supplied over conductors 135, 138, and 139, the generators which are operating at the time will operate as motors, draw reverse current from the battery and cause the release of their reverse current relays such as relay 112 and contactors such as contactor 111, which are associated with generator 1. The failure of the power also releases relay 208 whose winding is bridged across power supply conductors 138 and 139. The release of relay 208 opens the locking circuit to relays 227, 509, and 511, releasing any of these relays which may be operated due to the associated generating set being in operation at that time. By releasing these relays the load is applied gradually after a power failure when relay 208 reoperates upon the return of the power supply. Generator 1 is started and connected to the load and the other generators in order depending on the load as previously described. In order to prevent the generators being returned to the load with their motor rheostats in the position they happened to be at the time of power failure, normal circuits from the back contacts of relay 307, 605, and 610 are provided to return the rheostats to their maximum resistance cut in positions, as previously described.

*Constant voltage charge*

If it is desired to charge the battery without reference to the load, key 611 is operated. The operation of this key removes the short circuit from variable resistance 619, causing voltmeter relay 615 to close its low and high contacts at a higher potential than for the "floating" condition previously described. The effect of raising the voltage at which relay 615 closes its high and low contacts is to raise the voltage of the generators in operation and cause the battery to be charged.

*Manual control of voltage*

If, because of the failure of voltmeter relay relay 615 or for any other reason it is desired to manually control the charging or floating rate, key 613 is operated which disconnects the contacts of relays 616 and 617 from the control circuit and substitutes keys 612 and 614. Under this condition the operation of key 612 causes the motor rheostat which is connected to the control circuit at that time to cut in resistance in the generator field circuit and lower the generator voltage. In a similar manner the operation of key 614 causes the attached motor rheostat to cut resistance out of the generator field circuit associated with it and raise the generator voltage.

*Fuse failure*

The fuses shown on the drawing are of the alarm giving or "grasshopper" type. Should the main charging fuse, shown at 620 on the drawings, fail, the charging circuit will be opened and spring 622 will pull down member 623 into contact with terminal 621, thereby connecting battery through members 623 and terminal 621 to ground through the winding of relay 504, operating this relay. Relay 504, operated, opens the operating circuits for relays 102, 107, 402, and 407, releasing any of them which may be operated and disconnecting the associated motors from the power supply by releasing whichever of motor starters 101, 106, 401, and 406 that may be operated at the time failure occurs. The operation of relay 504 also places ground through its left-hand inner front contact, through the winding of relay 528 to battery, operating relay 528 and lighting lamp 530 as an alarm signal.

If any one of the individual generator fuses 141, 143, 435 or 438 operates, ground is connected to terminals 148, 149, 439 or 440 and the associated relay 202, 205, 502 or 505 is operated, disconnecting the generating set from the load. For example, let it be assumed that generating sets 1 and 2 are in operation and that the fuse 143 associated with generator 2 operates. After fuse 143 opens the charging circuit, member 157 is pulled down by spring 151 into contact with terminal 149, completing a circuit from ground through ammeter relay 118, member 157, terminal 149, through the left-hand winding of relay 205 to battery operating relay 205. Relay 205 locks in a circuit traced from ground through the left-hand back contacts of key 126 to battery through the right-hand winding and right-hand outer front contacts of relay 205. Relay 205, operated, opens the circuit to relay 107, releasing this relay and stopping motor 108; operates relays 204 and 308 in a circuit traced from ground through the right-hand back contacts of relay 504, right-hand inner front contact of relay 205 to battery through the windings of relays 204 and 308 in parallel and operates alarm relay 527 in a circuit traced from battery through the left-hand front contacts of relay 205 to ground through the winding of relay 527. The operation of relay 204 transfers the contact of ammeter relay 117 from the winding of relay 227 to the winding of relay 509, starting generator 3, if the contacts of ammeter relay 117 are closed and if the voltage of the battery is low, causing the operation of relay 510. Relay 527, operated, lights lamp 530 as an alarm signal. The way in which generator 3 is started, connected to the load and the control shifted, has been previously described.

Should any of the fuses 115, 116, 131, 132, 415, 416, 431 or 432, associated with control circuit operate, the motor-generator set associated with the operated fuse will be stopped and the succeeding generator set started and connected to the load. For example, if generators 1 and 2 are in operation and fuse 131, associated with the control circuit of generator 2 operates, member 161 is pulled down by spring 155 into contact with terminal 147 and a circuit is completed from battery through member 161, terminal 147, right-hand outer back contact and right-hand winding of relay 205 to ground through the left-hand back contact of key 126. Relay 205 operates in this circuit, locks and operates relay 204, stopping generator 2 and starting generator 3 as previously described.

What is claimed is:

1. In a regulating system, a load circuit, a storage battery associated therewith, a first generator connected across said battery and supplying current to said battery and load circuit, a second generator, and control means jointly responsive to a predetermined battery voltage and a predetermined current output of said first generator independent of the output of the battery to cause said second generator to start and be connected to the battery in parallel with the first generator.

2. In a regulating system, a load circuit, a storage battery associated therewith, a first generator connected across said battery and supplying current to said battery and load circuit, a second generator, and control means responsive to a predetermined current output of said first generator independent of the output of the battery to cause said second generator to start and be connected to the battery and load in parallel with the first generator, and voltage responsive means associated with the battery adapted to disable said control means until the battery voltage is reduced to a predetermined value.

3. In an electric generating system, a load circuit, a storage battery associated therewith, a first generator connected across said battery and supplying current to said battery and load circuit, a plurality of other generators adapted to be started and connected across said battery in parallel with said first generator, and means individual to the second and each of the succeeding other generators jointly responsive to a predetermined battery voltage and a predetermined current output of the preceding generator to start the respective generators in succession and cause their connection to the load circuit.

4. In an electric generating system, a load circuit, a storage battery associated therewith, a first generator connected across said battery and supplying current to said battery and load circuit, a second generator, control means jointly responsive to a predetermined battery voltage and a predetermined current output of said first generator to cause said second generator to start, and means responsive to a predetermined higher battery voltage for a predetermined time interval before said second generator is connected to the battery and load to stop said second generator.

5. In an electric generating system, a load circuit, a storage battery associated therewith, a first generator connected across said battery and supplying current to said battery and load circuit, a second generator, manually operated switching means adapted to stop said first generator and cause said second generator to start and be connected to the battery and load circuit in substitution for the first generator, and means jointly responsive to restoration of said manual switching means and an increasing load to restart said first machine and cause it to assume the load of the second machine.

6. In an electric generating system, a load circuit, a storage battery associated therewith, a first generator connected across said battery and supplying current thereto and to the load circuit, a second generator, an alarm fuse individual to and associated with said first generator, and means responsive to the disruption of said fuse to stop said first generator and cause its disconnection from the battery and to start said second generator and cause its connection to the battery to supply current thereto in substitution for said first generator.

7. In an electric generating system, a load circuit, a storage battery associated therewith, a plurality of generators adapted to be successively started and connected in parallel across said battery and supply current thereto and to the load circuit in accordance with the current requirements of the load circuit, a common conductor between said generators and battery, an alarm fuse in circuit therewith, and means responsive to the disruption of said fuse to stop all generators in operation.

8. In an electric generating system, a load circuit, a storage battery associated therewith, a plurality of generators adapted to be successively started and connected in parallel across said battery and load circuit to supply current thereto in accordance with the current requirements of the load circuit, automatic voltage regulating means associated with each generator, a source of current for operating said regulating means, means responsive to a predetermined voltage of the storage battery for connecting said source to said regulating means, means for periodically interrupting said current source, a source of power for operating said generators, and means responsive to the failure of said power source and its subsequent resumption to disable said interrupting means.

HARVEY T. LANGABEER.